United States Patent
Tsui et al.

(10) Patent No.: US 7,009,480 B2
(45) Date of Patent: Mar. 7, 2006

(54) SEMI-RELEASABLE MAGNETIC TOOL

(75) Inventors: Gary Tsui, San Marino, CA (US); Daqing Zhu, Shanghai (CN)

(73) Assignee: Valtra, Inc., Pico Rivera, CA (US)

( * ) Notice: Subject to any disclaimer, the term of this patent is extended or adjusted under 35 U.S.C. 154(b) by 410 days.

(21) Appl. No.: 10/274,010

(22) Filed: Oct. 17, 2002

(65) Prior Publication Data

US 2003/0085786 A1   May 8, 2003

Related U.S. Application Data

(60) Provisional application No. 60/344,938, filed on Nov. 8, 2001.

(51) Int. Cl.
*H01F 7/20* (2006.01)

(52) U.S. Cl. ............................ 335/287; 269/8; 335/285
(58) Field of Classification Search ......... 335/285–289, 335/291, 295; 269/8
See application file for complete search history.

(56) References Cited

U.S. PATENT DOCUMENTS

| | | | |
|---|---|---|---|
| 2,280,437 A | | 4/1942 | Levesque |
| 3,812,629 A | * | 5/1974 | Campbell ................... 451/364 |
| 4,023,267 A | | 5/1977 | Pignataro |
| 4,055,824 A | | 10/1977 | Baermann |
| 4,314,219 A | * | 2/1982 | Haraguchi .................. 335/295 |
| 4,329,673 A | * | 5/1982 | Uchikune et al. ........... 335/288 |
| 4,393,363 A | | 7/1983 | Iwasaki |
| 4,413,417 A | | 11/1983 | Esposito |
| 4,419,644 A | * | 12/1983 | Baermann ................... 335/288 |
| 4,468,649 A | | 8/1984 | Matsuhashi |
| 4,470,032 A | * | 9/1984 | Hernandez et al. ......... 335/288 |
| 4,475,026 A | | 10/1984 | Schloerb |
| 5,066,936 A | * | 11/1991 | Hsu ........................... 335/295 |
| 5,266,914 A | * | 11/1993 | Dickson et al. ............. 335/288 |
| 5,491,907 A | | 2/1996 | Vidmar |
| 5,525,950 A | | 6/1996 | Wang |
| 6,331,810 B1 | * | 12/2001 | Jung .......................... 335/288 |

FOREIGN PATENT DOCUMENTS

GB            2211356 A  *  6/1989

* cited by examiner

*Primary Examiner*—Lincoln Donovan
*Assistant Examiner*—Bernard Rojas
(74) *Attorney, Agent, or Firm*—Bruce A. Jagger

(57) ABSTRACT

A semi-releasable magnetic tool is disclosed. The tool comprises two magnetizable pole plates. Each of said pole plates is bounded by peripheral edges. The pole plates are spaced apart and preferably disposed in substantial registry with one another. A generally non-magnetizable spacer member is positioned between the pole plates and spaced inwardly from the peripheral edges. A magnetic switch is mounted between the pole plates. The switch is switchably associated with at least one magnetic element. The magnetic element positioned so as to magnetize the pole plates. The magnetic element can be switchably moved toward and away from the pole plates so that they are strongly or weakly magnetized. The magnetization of the tool in the weaker configuration is such that the tool can be easily placed in a desired position on a magnetizable workpiece. The tool is clamped in position on the workpiece by moving the magnet (s) closer to the pole plates.

16 Claims, 4 Drawing Sheets

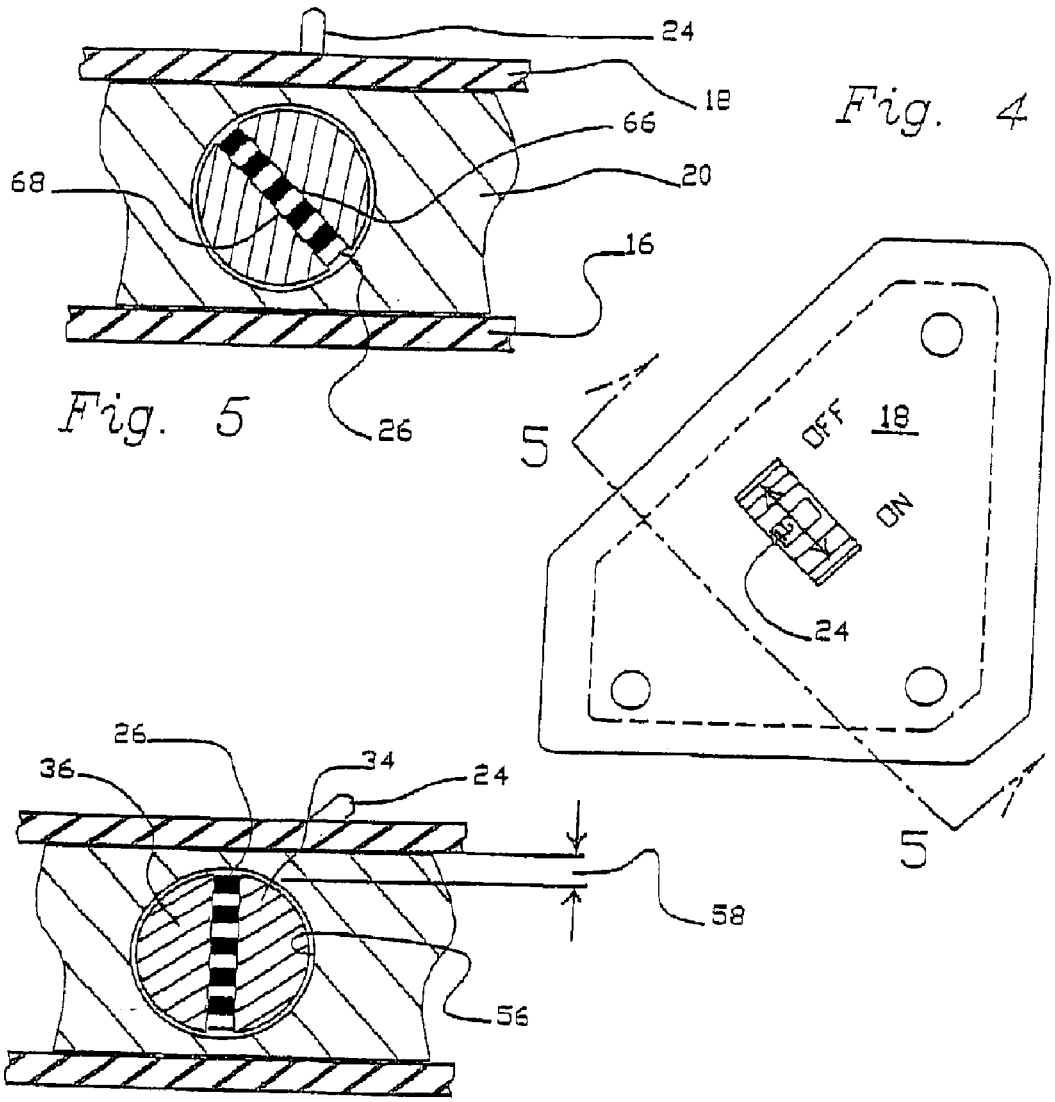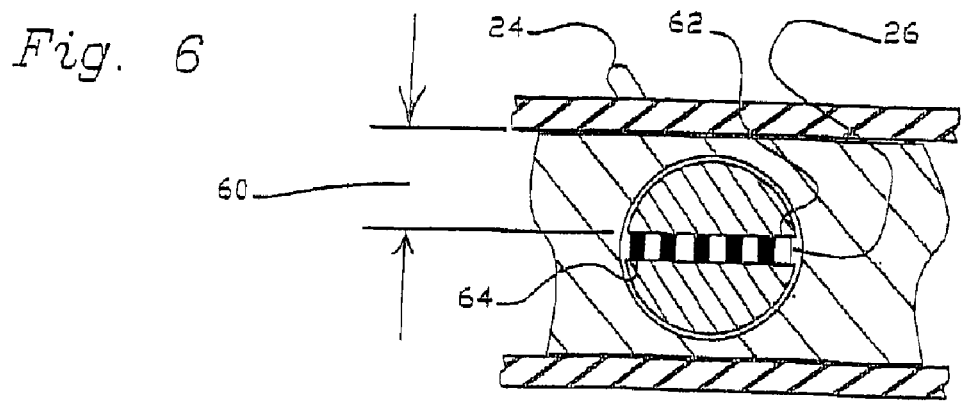

SEMI-RELEASABLE MAGNETIC TOOL

RELATED APPLICATIONS

This application claims the benefit of Provisional Ser. No. 60/344,938, filed Nov. 08, 2001.

BACKGROUND OF THE INVENTION

1. Field of the Invention

The invention relates in general to magnetic gauges and, in particular, to semi-releasable magnetic tools.

2. Description of the Prior Art

Magnetic chucks of various designs are well known and widely used. See, for example, Esposito U.S. Pat. No. 4,413,417 (an adjustable toolmakers square is held to the table of a machine tool by means of a conventional magnetic chuck); Pignataro U.S. Pat. No. 4,023,267 (a magnetic chuck of the interlocking finger type); Matsuhashi U.S. Pat. No. 4,468,649 (a switchable permanent magnetic chuck with slidably opposed poles, the sliding of which moves the chuck between magnetically excited and non-excited states); and Baermann U.S. Pat. No. 4,055,824 (a permanent magnet holding device in which the rotation of a magnetized wheel switches the device between the energized and non-energized configurations). Switching between the energized and non-energized positions in these devices is generally accomplished by slidably or rotatably moving like poles to either adjacent or opposed proximity. Various rotary magnetic switches operating on about the same or a related principle have been proposed. See, for example, Iwasaki U.S. Pat. No. 4,393,363; Wang U.S. Pat. No. 5,525,950; Levesque U.S. Pat. No. 2,280,437; and Hernandaz U.S. Pat. No. 4,470,032. The positioning of permanent magnets between ferrous pole plates where the pole plates then magnetically attach themselves to a ferrous workpiece is known. See, for example, Schloerb et al. U.S. Pat. No. 4,475,026; and Vidmar U.S. Pat. No. 5,491,907.

Various magnetic clamps for holding parts in a desired configuration while they are assembled together by welding have been proposed. For example, a non-switchable commercially available magnetic angle gauge permits the positioning and magnetic holding of workpieces in 90 and 45 degree positions. Once securely in position, this prior device is difficult to remove from the workpieces. This interferes with the intended use of the angle gauge. Typically, an operator needs to adjust the workpieces to accurately position them. This adjusting is preferably done by hand so as to avoid damaging the workpieces, and to achieve a high degree of accuracy. Where the magnetic angle gauges hold the workpieces too strongly, tools, such as hammers, must be used to overcome the strength of the magnetic forces. Accuracy is likely to suffer, and there is a risk of damaging the parts and the gauge. Removal of a non-switchable angle gauge from the finished part may also require the use of more force than is good for either the part or the angle gauge.

These and other difficulties of the prior art have been overcome according to the present invention.

BRIEF SUMMARY OF THE INVENTION

A preferred embodiment of the semi-releasable tool according to the present invention comprises a semi-releasable tool according to the present invention wherein a pair of pole plates are disposed in generally parallel relationship with a magnetic element rotatably mounted therebetween. A magnetic switch is adapted to switching the tool between a first configuration where the pole plates are spaced from a magnetic element far enough so that the plates are only weakly magnetized, and a second configuration where they are close enough to a magnetic element to be strongly magnetized. The variation in the magnetic strength is accomplished by varying the spacing between a magnet and the pole plates, rather than moving like magnetic poles between opposed and juxtaposed configurations, or moving the magnet between magnetically shunted and non-shunted configurations. No opposing magnets are required.

The semi-releasable tool is generally used by switching the tool to a configuration where the pole plates are weakly magnetized while the tool is being positioned on the workpiece. When the tool is in the desired position with respect to the workpiece it is switched to a configuration where the pole plates are strongly magnetized. Thus, the tool can be positioned without too much interference from magnetic attraction. Once positioned, the tool can be securely mounted in place by magnetic attraction.

Other objects, advantages, and novel features of the present invention will become apparent from the following detailed description of the invention when considered in conjunction with the accompanying drawings.

BRIEF DESCRIPTION OF THE DRAWINGS

The present invention provides its benefits across a broad spectrum of magnetically mounted tools. While the description which follows hereinafter is meant to be representative of a number of such applications, it is not exhaustive. As those skilled in the art will recognize, the basic methods and apparatus taught herein can be readily adapted to many uses. It is applicant's intent that this specification and the claims appended hereto be accorded a breadth in keeping with the scope and spirit of the invention being disclosed despite what might appear to be limiting language imposed by the requirements of referring to the specific examples disclosed.

Referring particularly to the drawings for the purposes of illustration only and not limitation:

FIG. 4 is a plan view of the embodiment of FIG. 1.

FIG. 5 is a broken cross-sectional view taken along section 5—5 in FIG. 4 showing a magnetic element in a partially engaged configuration.

FIG. 6 is a view similar to FIG. 5 showing the magnetic element in a maximum engaged configuration.

FIG. 7 is a view similar to FIG. 5 showing the magnetic element in a minimum engaged configuration.

DETAILED DESCRIPTION OF THE PREFERRED EMBODIMENTS

Figure 1:
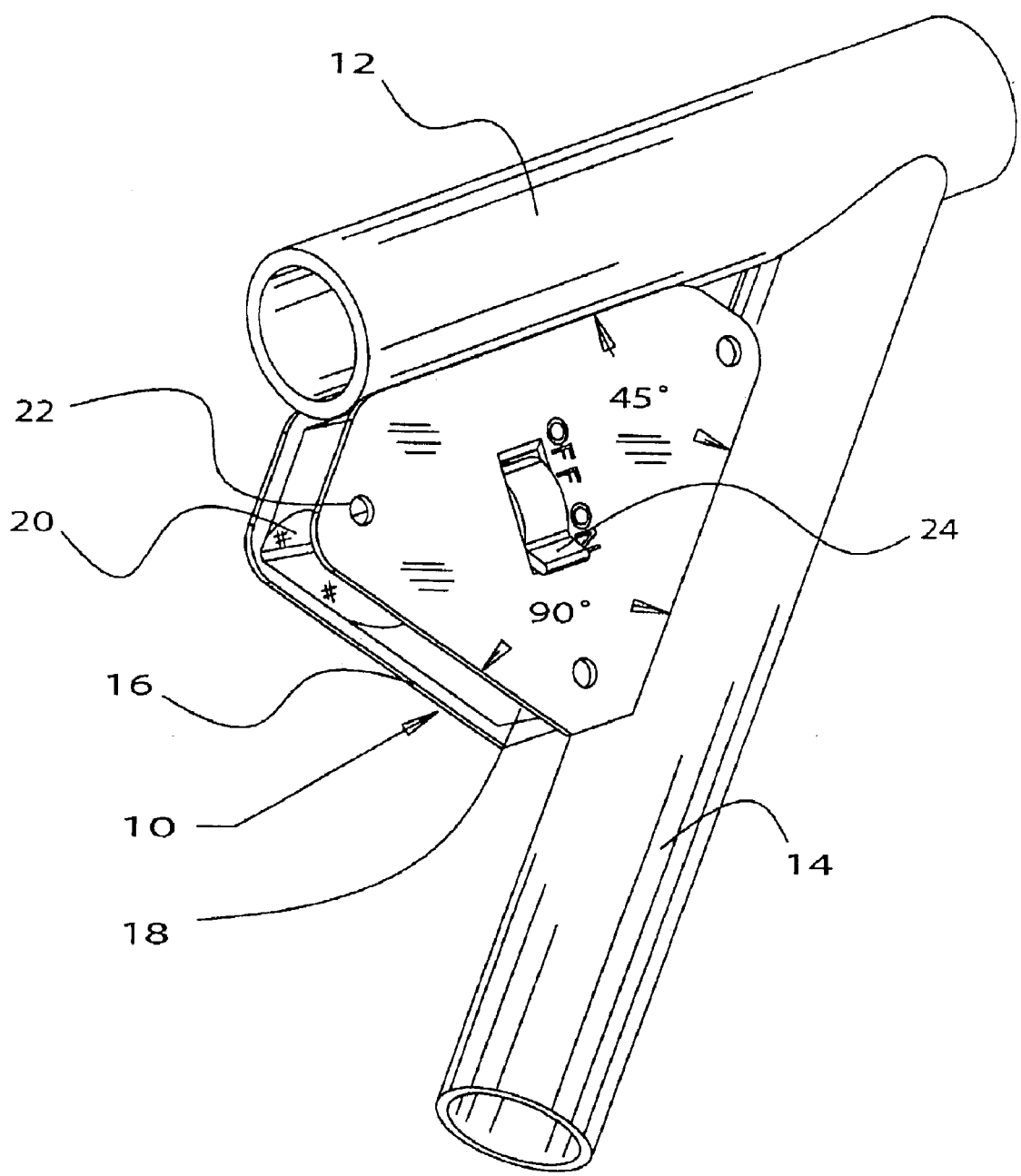
FIG. 1 is an isometric view of a preferred embodiment of the invention illustrating an angle gauge holding two cylindrical tubes at a 45 degree angle in preparation for being welded or brazed together.
Figure 2:
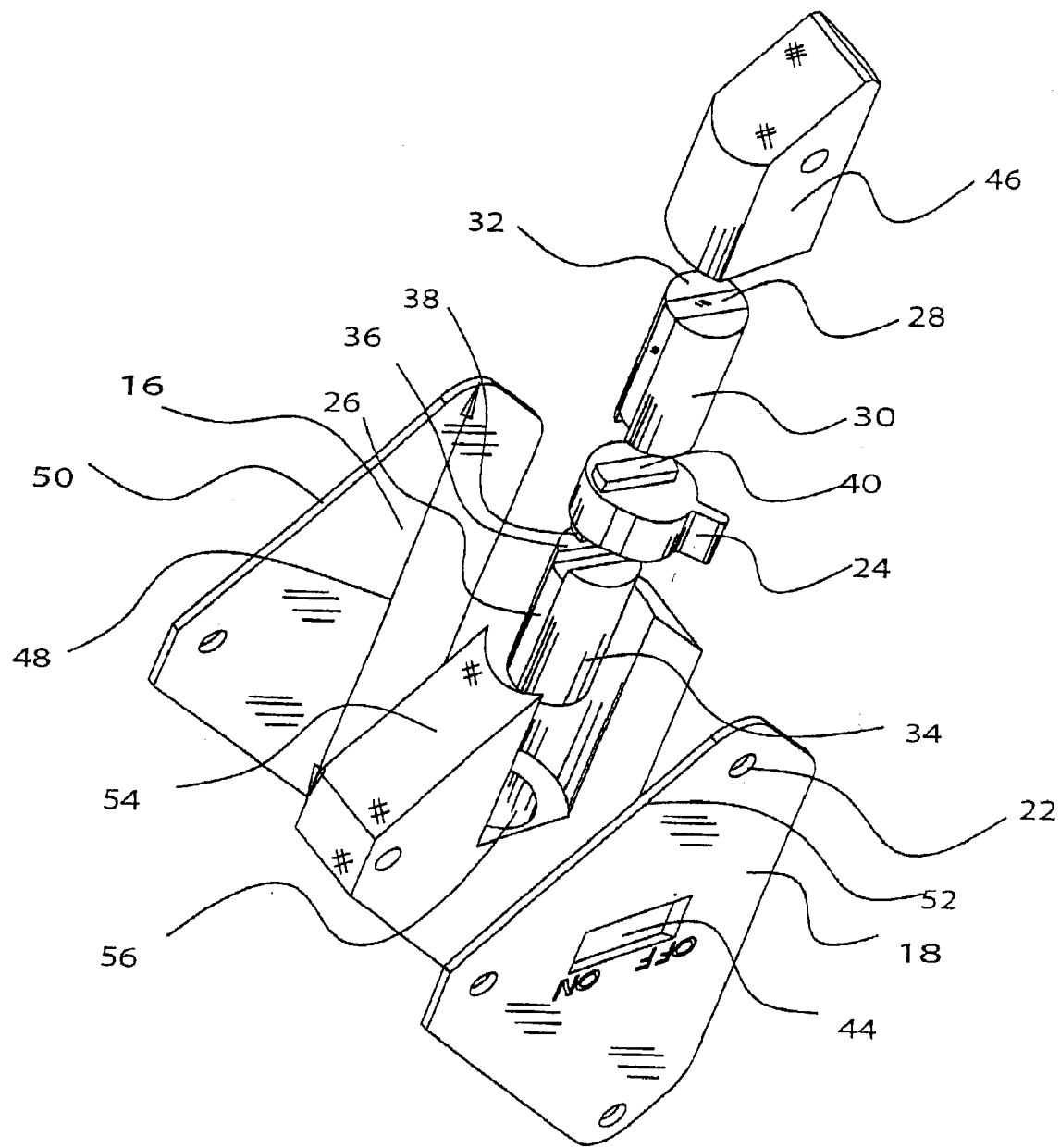
FIG. 2 is an exploded isometric view of the embodiment of FIG. 1.
Figure 3:
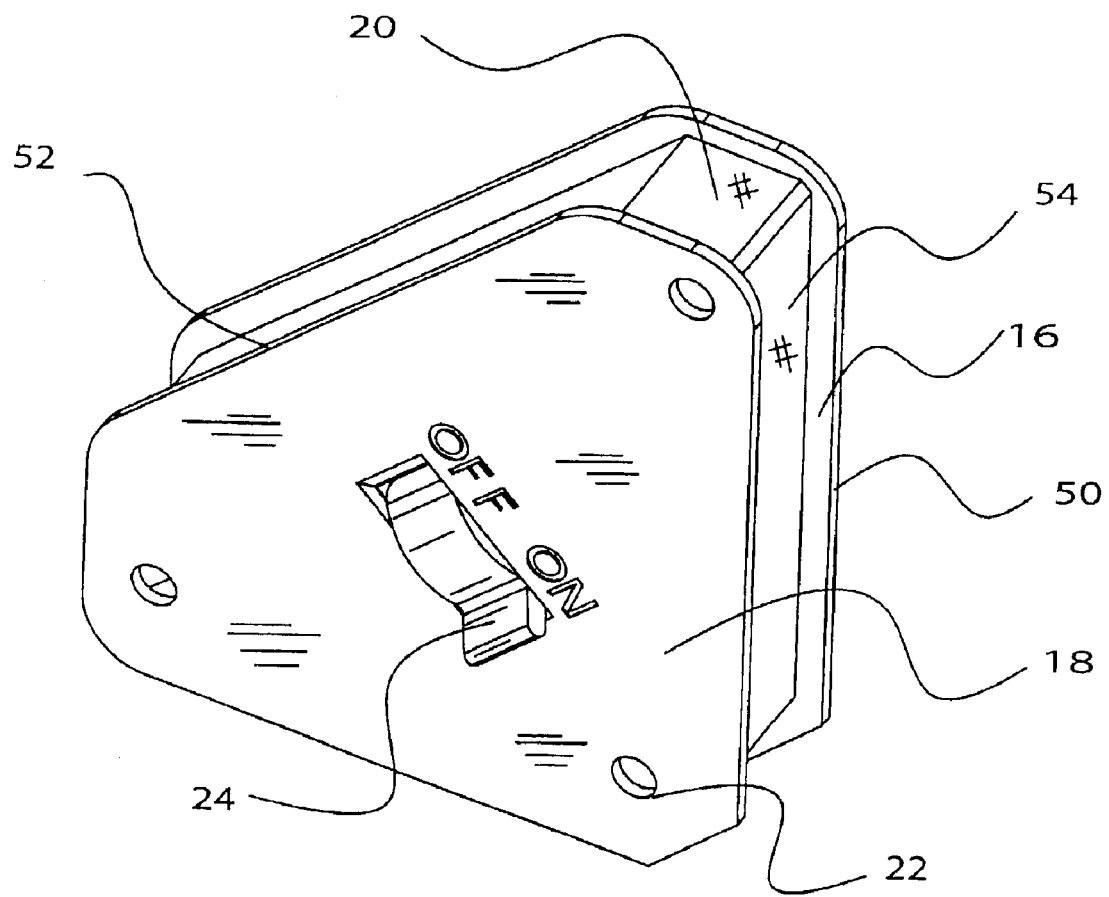
FIG. 3 is an isometric view of the embodiment of FIG. 1 in a fully assembled view.

Referring now to the drawings wherein like reference numerals designate identical or corresponding parts throughout the several views, there is illustrated generally at 10 a tool in the form of a hold down or angle gauge, which is positioned to hold cylindrical tube 12 at 45 degrees to cylindrical tube 14. Tubes 12 and 14 can be tacked together while tool 10 holds them in the desired relationship to one another. Tool 10 can then be removed, and tubes 12 and 14 can be welded or brazed together.

In the preferred embodiment, which has been selected for purposes of illustration only, but not limitation, tool 10 includes magnetizable pole plates 16 and 18. Pole plates 16 and 18 are spaced apart in generally parallel registered relationship. Pole plate 16 is preferably, but not necessarily, substantially a mirror image of pole plate 18. That is, pole plates 16 and 18 preferably have generally the same peripheral form with their respective peripheral edges being is substantial registry with one another. The pole plates are held in spaced apart relationship by non-magnetic spacer 20. The spacer 20 is spaced inwardly from the peripheral edges of pole plates 16 and 18 so that the peripheral edges of the pole plates can bear firmly on curved surfaces such as those exhibited by tubes 12 and 14. The pole plates and non-magnetic spacer 20 are held together in the desired registry by a suitable fasteners, such as, for example, screws, nuts and bolts, rivets, or the like, through holes of which 22 is typical. Holes 22 in the pole plates register with matching holes in the non-magnetic spacer 20 so that the same fasteners hold the entire assembly together in the desired configuration. The peripheral edges of the pole plates generally extend at predetermined angles to one another. As illustrated particularly in FIG. 1, the provision of a set of peripheral edges that extend at 90 degrees permits the tool to be used to hold workpieces in a perpendicular arrangement to one another. Also, the provision of a set of peripheral edges that extend at 45 degrees to one another permits the tool to be used to hold workpieces at 45 degrees to one another as is shown by the positioning of tubes 12 and 14. Other acute and obtuse angles can be formed between adjacent peripheral edges as may be desired.

As illustrated particularly in FIGS. 2, 5, 6 and 7, two generally cylindrical magnetic elements are rotatably mounted between pole plates 16 and 18 for rotatable actuation by switch 24. One, two, three or more magnetic elements can be employed if desired. Switch 24 is adapted to rotate magnets 26 and 28 through approximately 90 degrees between the configurations shown in FIGS. 6 and 7. A first magnetic element illustrated particularly in FIGS. 2, 5, 6, and 7 comprises a permanent magnet 26, sandwiched between semi-cylindrical, non-magnetic blocks 34 and 36. The purpose of non-magnetic blocks 34 and 36 is to provide a generally cylindrical form that is rotatably journaled in generally cylindrical bore 56, and to maintain the desired spaced relationship between the pole plates and the magnet at each rotational position.

In the embodiment chosen for illustration, the magnetic elements are journaled for rotation in a bore as compared with, for example, mounting the magnetic elements on a rotatably mounted axle. Magnet 26 is recessed between blocks 34 and 36 so as to provide a slot, which receives tongue 38. The engagement between tongue 38 and the slot in the magnetic element provides for the rotation of the magnetic element with the actuating movement of magnetic switch 24. A second magnetic element comprised of magnet 28, and non-magnetic semi-cylindrical blocks 30 and 32 is rotatably journaled in a cylindrical bore (not shown) in non-magnetic spacer plug 46. The engagement of tongue 40 in a slot formed by axially recessing magnet 28 serves the same purpose as the similar engagement of tongue 38 with its mating slot. The first and second magnetic elements share a generally common longitudinal axis. At least one of the pole plates 16 and 18 is provided with a switch aperture 44 through which switch 24 can be manipulated through the configurations shown in FIGS. 5 through 7.

Plug 46 in the assembled configuration serves as a part of non-magnetic spacer 20. The presence of plug 46 makes it possible to assemble and disassemble the magnetic elements from the tool. The face 54 of non-magnetic spacer 20 is spaced inwardly from the adjacent peripheral edges 50 and 52 of the respective pole plates. All of the faces of non-magnetic spacer 20 are set back from the adjacent peripheral edges of the pole plates so as to permit a workpiece to protrude into the spaces between the peripheral edges (see FIG. 4). This facilitates the mounting of the tool to, for example, an arcuate surface.

The pole plates are generally planar in shape and have a span between opposed peripheral edges. There is at least one dimension for each pole plate where the span is at a maximum. Such a maximum span or longest dimension is illustrated at 48 (see FIG. 2). It has been found that the positioning of the longitudinal axis of the magnetic element (s) along this maximum span enhances the maximum magnetic attraction exhibited by the tool.

In the embodiment chosen for illustration, the tool is in the form of an angle gauge or hold down tool. This function dictates that the pole plates have substantially the same peripheral form, that they be mounted substantially parallel to one another, and that they be mounted in substantial registry with one another.

Magnet 26 rotates generally about its longitudinal axis through an arc of approximately 90 degrees under the urging of switch 24. Magnet 26 has a width between longitudinally margins 62 and 64 (see FIG. 7), a length along its longitudinal axis, and a thickness between its sides 66 and 68 (see FIG. 5). Magnet 26 is substantially wider than it is thick so rotation about its longitudinal axis moves the longitudinal margins 62 and 64 towards and away from the respective pole plates. The maximum distance between the longitudinal margins and the pole plates is illustrated, for example, at 60 (see FIG. 7), and the minimum distance is illustrated, for example, at 58 (see FIG. 6). In general, the maximum distance 60 is at least about twice, and preferably at least about three times, the minimum distance 58. The longitudinal axis of the magnetic elements is position approximately parallel to and equidistant between the pole plates. Each of the longitudinal margins 62 and 64 is thus about the same distance from the pole plate with which it is most closely associated. That is, the maximum and minimum distances, 60 and 58 are about the same for each of the longitudinal margins.

The strength of the magnetic attraction exerted by the pole plates on a workpiece when the longitudinal margins are positioned at the maximum distance 60, although present, is weak enough that the tool can be easily positioned on the workpiece. When the switch 24 is moved to bring the longitudinal margins of the magnet as close as possible to the respective pole plates (see FIG. 6) the tool is strongly clamped to the workpiece. Switching the magnetic elements between the weakly and strongly engaged positions is easily accomplished by the actuation of switch 24.

What have been described are preferred embodiments in which modifications and changes may be made without departing from the spirit and scope of the accompanying claims. Clearly, many modifications and variations of the present invention are possible in light of the above teachings. It is therefore to be understood that, within the scope of the appended claims, the invention may be practiced otherwise than as specifically described.

What is claimed is:

1. A semi-releasable magnetic tool comprising:
   a pair of substantially identical, generally parallel, spaced apart, magnetizable plates, each of said magnetizable plates having edges extending at predetermined angles to one another, said magnetizable plates being juxtaposed substantially mirroring one another with substantially all of the edges in a first of said plates being in substantial registry with the corresponding edges in a second of said plates, at least two of said edges in said first plate extending at about right angles to one another, and at least two of said edges in said first plate extending at an acute angle to one another;

a generally non-magnetizable spacer member positioned between said magnetizable plates, and substantially all of said edges extending beyond said non-magnetizable spacer member;

a magnet having a width, a length and a thickness, said magnet being rotatably disposed between said plates, said magnet having a longitudinal axis, said longitudinal axis extending generally parallel to said magnetizable plates and along said length, said magnet being mounted for rotation approximately about said longitudinal axis, said width being at least approximately twice said thickness; and an actuator extending through at least one of said plates, said actuator being accessible from outside said semi-releasable magnetic tool, operatively associated with said magnet, and adapted to cause said rotation.

2. A semi-releasable magnetic tool of claim 1 wherein said magnet includes longitudinally extending margins, said longitudinally extending margins being spaced apart by about said width, extending generally parallel to said longitudinal axis, and spaced from said magnetizable plates by a distance, whereby said rotation of said magnet approximately about said longitudinal axis changes said distance between said longitudinally extending margins and said magnetizable plates between a maximum distance and a minimum distance, said parallel plates being partially magnetized at said maximum distance and fully magnetized at said minimum distance.

3. A semi-releasable magnetic tool of claim 1 wherein said magnet is a permanent magnet.

4. A semi-releasable magnetic tool of claim 1 wherein said magnet includes at least two magnets.

5. A semi-releasable magnetic tool of claim 1 wherein said magnetizable plates have a long dimension between said edges at least as great as any other dimension between said edges, said longitudinal axis being aligned to extend approximately parallel to said long dimension.

6. A semi-releasable magnetic tool of claim 5 wherein said magnet extends for approximately the length of said long dimension.

7. A semi-releasable magnetic tool of claim 1 wherein two of said edges extend at an obtuse angle to one another.

8. A semi-releasable magnetic angle gauge comprising:

first and second plates, said plates being magnetizable, said plates being disposed in generally spaced apart, registered, parallel relationship to one another, and each said plate having peripheral edges, substantially all of the edges in said first plate being in substantial registry with the corresponding edges in said second plate, at least two of said edges in said first plate extending at about right angles to one another, and at least two of said edges in said first plate extending at an acute angle to one another;

a magnet, said magnet being mounted between said plates, said magnet being moveable between a strongly engaged position where said plates are strongly magnetized and a weakly engaged position where said plates are weakly magnetized; and an actuator, said actuator being operatively associated with said magnet and accessible through at least one of said plates, said actuator being adapted to move said magnet between said strongly and weakly engaged positions.

9. A semi-releasable magnetic angle gauge of claim 8 wherein said plates are mounted on generally opposed sides of a non-magnetizable spacer.

10. A semi-releasable magnetic tool comprising:

first and second plates, said plates being magnetizable, said plates being disposed in generally spaced apart, registered, parallel relationship to one another, and each said plate having peripheral edges, at least two of the peripheral edges of said first plate extending generally parallel to the corresponding edges of said second plate;

a generally non-magnetizable spacer member positioned between said plates;

a permanent magnet having a width, a length and a thickness, said permanent magnet being rotatably disposed between said plates, said permanent magnet being rotatably moveable between an strongly engaged position where said plates are strongly magnetized and a weakly engaged position where said plates are weakly magnetized, said permanent magnet having a longitudinal axis, said longitudinal axis extending generally parallel to said plates and along said length, said permanent magnet being mounted for rotation approximately about said longitudinal axis, said width being at least approximately twice said thickness; said permanent magnet including longitudinally extending margins, said longitudinally extending margins being spaced apart by about said width, extending generally parallel to said longitudinal axis, and spaced from said plates by a distance, whereby said rotation of said permanent magnet changes said distance between said longitudinally extending margins and said plates between a maximum distance and a minimum distance, said parallel plates being partially magnetized at said maximum distance and fully magnetized at said minimum distance, said maximum distance being at least about twice said minimum distance; and an actuator, said actuator being operatively associated with said permanent magnet and adapted to move said permanent magnet between said strongly and weakly engaged positions.

11. A semi-releasable magnetic tool comprising:

first and second pole plates, said pole plates being magnetizable, each of said pole plates being bounded by peripheral edges and having a maximum span between said peripheral edges, said pole plates being spaced apart and disposed in substantial registry with one another;

a generally non-magnetizable spacer member positioned between said pole plates and spaced inwardly from said peripheral edges;

a magnetic switch mounted between said pole plates, said switch being switchably associated with a magnetic element, said magnetic element being adapted to magnetizing said pole plates, said magnetic element being switchably moveable toward and away from said pole plates, said magnetic element having a width, a length, and a thickness, said width being greater than said thickness and said length being greater than said width, said magnetic element being mounted within said generally non-magnetizable spacer member switchably moveable generally about its said length and generally parallel to said maximum span.

12. A semi-releasable magnetic tool of claim 11 wherein each of said pole plates has substantially the same peripheral form.

13. A method of attaching a semi-releasable magnetic tool to a magnetizable workpiece wherein said semi-releasable magnetic tool includes first and second pole plates, said pole plates being magnetizable, each of said pole plates being bounded by peripheral edges and having generally the same planform, said pole plates being spaced apart and disposed in substantial registry with one another; a generally non-magnetizable spacer member positioned between said pole plates and spaced inwardly from said peripheral edges; a magnetic switch mounted between said pole plates, said switch being switchably associated with a magnetic element, said magnetic element being adapted to magnetizing said pole plates, said magnetic element being switchably moveable toward and away from said pole plates, said magnetic element having a width, a length and a thickness, said magnet being rotatably disposed between said plates, said magnet having a longitudinal axis, said longitudinal axis extending generally parallel to said magnetizable plates and along said length, said magnet being mounted for rotation approximately about said longitudinal axis, said width being at least approximately twice said thickness, said magnetic element being mounted within said generally non-magnetizable spacer, said generally non-magnetizable spacer member having a thickness that is at least approximately as great as said width, said method of attaching comprising:

switchably moving said magnetic element away from said pole plates;

placing said peripheral edges at a desired location on said magnetizable workpiece; and switchably moving said magnetic element toward said pole plates.

14. A semi-releasable magnetic tool comprising:

first and second plates, said plates being magnetizable, said plates being disposed in generally spaced apart, registered, parallel relationship to one another, and each said plate having peripheral edges, at least two of the peripheral edges of said first plate extending generally parallel to the corresponding edges of said second plate;

a generally non-magnetizable spacer member positioned between said plates;

a permanent magnet having a width, a length and a thickness, said permanent magnet being rotatably disposed between said plates, said permanent magnet being rotatably moveable between an strongly engaged position where said plates are strongly magnetized and a weakly engaged position where said plates are weakly magnetized, said permanent magnet having a longitudinal axis, said longitudinal axis extending generally parallel to said plates and along said length, said permanent magnet being mounted for rotation approximately about said longitudinal axis, said width being at least approximately twice said thickness; said permanent magnet including longitudinally extending margins, said longitudinally extending margins being spaced apart by about said width, extending generally parallel to said longitudinal axis, and spaced from said plates by a distance, whereby said rotation of said permanent magnet changes said distance between said longitudinally extending margins and said plates between a maximum distance and a minimum distance, said parallel plates being partially magnetized at said maximum distance and fully magnetized at said minimum distance, said maximum and minimum distances being about the same for each of said longitudinal margins; and an actuator, said actuator being operatively associated with said permanent magnet and adapted to move said permanent magnet between said strongly and weakly engaged positions.

15. A semi-releasable magnetic tool comprising:

first and second plates, said plates being magnetizable, said plates being disposed in generally spaced apart, registered, parallel relationship to one another, and each said plate having peripheral edges, at least two of the peripheral edges of said first plate extending generally parallel to the corresponding edges of said second plate;

a generally non-magnetizable spacer member positioned between said plates;

a permanent magnet having a width, a length and a thickness, said permanent magnet being rotatably disposed between said plates, said permanent magnet being rotatably moveable between an strongly engaged position where said plates are strongly magnetized and a weakly engaged position where said plates are weakly magnetized, said permanent magnet having a longitudinal axis, said longitudinal axis extending generally parallel to said plates and along said length, said permanent magnet being mounted for rotation approximately about said longitudinal axis, said width being at least approximately twice said thickness; said permanent magnet including two longitudinally extending margins, said longitudinally extending margins being spaced apart by about said width, extending generally parallel to said longitudinal axis, and spaced from said plates by a distance, whereby said rotation of said permanent magnet changes said distance between said longitudinally extending margins and said plates between a maximum distance and a minimum distance, said parallel plates being partially magnetized at said maximum distance and fully magnetized at said minimum distance; and an actuator, said actuator being operatively associated with said permanent magnet and adapted to move said permanent magnet between said strongly and weakly engaged positions.

16. A semi-releasable magnetic tool comprising:

first and second plates, said plates being magnetizable, said plates being disposed in generally spaced apart, registered, parallel relationship to one another, and each said plate having peripheral edges, at least two of the peripheral edges of said first plate extending generally parallel to the corresponding edges of said second plate, each of said plates having a maximum span between said peripheral edges;

a generally non-magnetizable spacer member positioned between said plates;

a permanent magnet having a width, a length and a thickness, said permanent magnet being rotatably disposed between said plates, said permanent magnet being rotatably moveable between an strongly engaged position where said plates are strongly magnetized and a weakly engaged position where said plates are weakly magnetized, said permanent magnet having a longitudinal axis, said longitudinal axis extending generally parallel to said plates and along said length, said longitudinal axis being aligned generally with said maximum span, said permanent magnet being mounted for rotation approximately about said longitudinal axis, said width being at least approximately twice said thickness; said permanent magnet including longitudinally extending margins, said longitudinally extending margins being spaced apart by about said width, extending generally parallel to said longitudinal axis, and spaced from said plates by a distance, whereby said rotation of said permanent magnet changes said distance between said longitudinally extending margins and said plates between a maximum distance and a minimum distance, said parallel plates being partially magnetized at said maximum distance and fully magnetized at said minimum distance; and an actuator, said actuator being operatively associated with said permanent magnet and adapted to move said permanent magnet between said strongly and weakly engaged positions.

* * * * *